(12) United States Patent
Ingram

(10) Patent No.: US 8,291,756 B2
(45) Date of Patent: Oct. 23, 2012

(54) MEASURING TYRE PRESSURE

(75) Inventor: Jonathan Francis Gordon Ingram, London (GB)

(73) Assignee: Opus Project Management Limited, Limassol (CY)

( * ) Notice: Subject to any disclaimer, the term of this patent is extended or adjusted under 35 U.S.C. 154(b) by 0 days.

(21) Appl. No.: 12/808,908

(22) PCT Filed: Dec. 17, 2008

(86) PCT No.: PCT/GB2008/004161
§ 371 (c)(1),
(2), (4) Date: Jun. 17, 2010

(87) PCT Pub. No.: WO2009/077752
PCT Pub. Date: Jun. 25, 2009

(65) Prior Publication Data
US 2010/0269576 A1    Oct. 28, 2010

(30) Foreign Application Priority Data
Dec. 17, 2007    (GB) .................................. 0724536.8

(51) Int. Cl.
B60C 23/02    (2006.01)
(52) U.S. Cl. ...................................................... 73/146.8
(58) Field of Classification Search .......... 73/146–146.8
See application file for complete search history.

(56) References Cited

U.S. PATENT DOCUMENTS

| | | | |
|---|---|---|---|
| 4,267,546 A | 5/1981 | Matsuda et al. | |
| 4,918,423 A | 4/1990 | Fukuyama | |
| 5,774,048 A | 6/1998 | Achterholt | |
| 6,101,870 A * | 8/2000 | Kato et al. | 73/146.8 |
| 7,551,069 B2 * | 6/2009 | Cohen | 340/442 |
| 2001/0008083 A1 * | 7/2001 | Brown | 73/146 |
| 2005/0081615 A1 * | 4/2005 | Stewart et al. | 73/146 |
| 2006/0081062 A1 | 4/2006 | Silverbrook | |

FOREIGN PATENT DOCUMENTS

| | | |
|---|---|---|
| DE | 198 53 135 A1 | 5/2000 |
| EP | 0 301 443 B1 | 2/1989 |
| EP | 0 417 704 A1 | 3/1991 |
| EP | 1 002 670 B1 | 5/2000 |
| FR | 2 845 031 A1 | 4/2004 |
| GB | 2065896 A | 7/1981 |
| GB | 2 405 931 A | 3/2005 |
| JP | 11180117 | 7/1999 |
| JP | 2001024415 A | 1/2000 |
| JP | 2000177340 A | 6/2000 |
| JP | 2005186658 A | 12/2003 |

OTHER PUBLICATIONS

Billen, International Search Report, PCT/GB2008/004161, Mar. 13, 2009.
Easterfield, Search Report under Section 17 Patents Act 1977, GB0724536.8, Mar. 17, 2008.

* cited by examiner

Primary Examiner — Andre Allen
(74) Attorney, Agent, or Firm — Michael A. Mann; Nexsen Pruet, LLC

(57) ABSTRACT

This invention provides a valve stem (21) for a tire. The valve stem (21) comprises at least one electrical circuit for measuring pressure within the tire. The circuit comprises a capacitive pressure sensor (5) and an inductive coil (6). The inductive coil (6) is coiled around the valve stem (21).

7 Claims, 3 Drawing Sheets

MEASURING TYRE PRESSURE

FIELD OF THE INVENTION

This invention relates to a valve stem comprising an electrical circuit for measuring pressure within a tyre.

BACKGROUND TO THE INVENTION

European Patent Application EP0202375 discloses the use of a passive oscillatory circuit to measure changes in the pressure of a tyre. The natural frequency of the disclosed circuit depends on the capacitive value of the circuit which changes with changes in pressure in the tyre. The natural frequency is measured by inductive coupling to coils outside the tyre. Using resonant circuits to measure the pressure in a tyre can be advantageous because such circuits are cheap to manufacture and generally reliable, in particular since they do not require an internal power source. However, a measuring system such as the one described in EP0202375 is far from ideal. The system is difficult to install or replace, requiring components to be positioned inside the wall of the tyre in order for the pressure to act upon them. The components are also vulnerable to damage while the tyre is in use. It would be desirable to provide a system that was both easier to install and more durable, as well as being more accessible both for use and for maintenance. Other systems for monitoring tyre pressure remotely are also disclosed in EP0108176 and DE4242861

SUMMARY OF THE INVENTION

This invention provides a valve stem for a tyre. The valve stem comprises at least one electrical circuit for measuring pressure within the tyre. The circuit comprises a capacitive pressure sensor and an inductive coil. The inductive coil is coiled around the valve stem.

In this way the invention provides a simple method for monitoring the conditions inside the tyre. The resonant frequency of the circuit will change as the pressure inside the tyre changes, and the resonant frequency can then be measured by coupling the coil to a remote detector. By locating the circuit in the valve stem, the sensor can be exposed to the air pressure in the tyre without being electromagnetically shielded by the metal components of the tyre and wheel.

In one embodiment of the invention, the valve stem comprises a first portion removably joined to a second portion. The first portion comprises the electrical circuit device and the second portion is connected to the tyre, in use. The first portion can be joined to the second portion using a screw thread, a clamp or similar mechanical means that can be released when required. The second portion can be joined to the tyre using such mechanical means, or by a more permanent bond achieved using chemical adhesive, solder or any other suitable method. In the event of a failure of the circuit in this embodiment, the first portion can be removed for maintenance or replaced completely. Similarly, if the tyre fails, the first portion can easily be used with another tyre. It may be that the first portion is a dust cap or a stem extension. The first portion may comprise a valve or a suitable place for attaching a valve. Alternatively, the second portion may comprise a valve and the first portion may comprise a prong or some other device suitable for opening the valve in the second portion when the first portion is joined to the second portion.

The valve stem may comprise a recess suitable for containing the inductive coil. Providing a recess helps to protect the coil from damage and from losing its shape. The recess will usually comprise an indentation set into a face or faces of the valve stem into which the inductive coil can be set.

The inductive coil may be located outside the valve stem. However, provided that the valve stem is made from a suitable non-magnetic material the inductive coil can also be located inside the valve stem.

According to the invention, it is the capacitance of the sensor that changes with the pressure. Because the resonant frequency of the circuit is dependent on both the inductance and capacitance of the circuit, it is also possible to use a sensor where the inductance or both the capacitance and the inductance of the sensor change with the pressure.

It may be desirable to measure other variables instead of or as well as pressure. For example, the variable to be measured may be temperature. Where necessary, the valve stem can comprise a plurality of circuits so that more than one variable can be measured.

BRIEF DESCRIPTION OF THE DRAWINGS

An embodiment of the invention will now be described, by way of example only, and with reference to the accompanying drawings, in which.

DETAILED DESCRIPTION OF EXEMPLARY EMBODIMENTS

Figure 1:
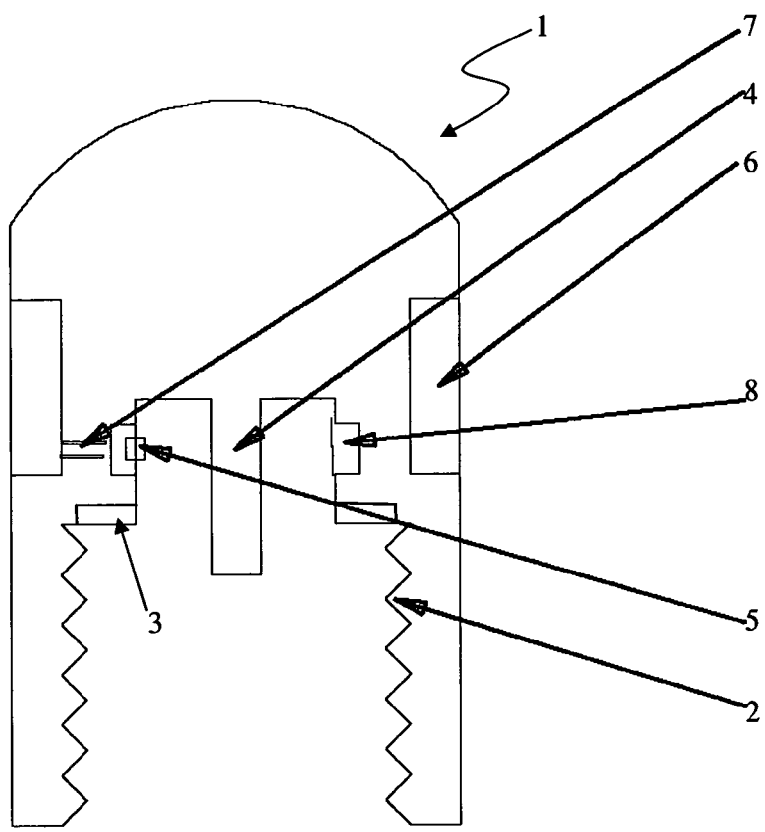
FIG. 1 is a diagram showing a cross section of a first embodiment of the invention in a dust cap.

FIG. 1 shows an embodiment of the invention in a dust cap 1. The dust cap 1 is provided with a first thread 2 so that it can be screwed onto the valve stem of a tyre. A rubber seal 3 provide an airtight seal when the dust cap 1 is screwed onto the stem. The seal is necessary because the dust cap 1 is also provided with a prong 4. The prong 4 depresses the valve in the stem and allows the pressure of the air in the dust cap to equalise with the pressure of the air in the tyre. The rubber seal 3 prevents air leaking into the environment outside the tyre.

A pressure sensor 5 is set into the inside of the dust cap 1, and is connected to a first coil 6 on the outside of the dust cap 1 through holes 7. The pressure sensor 5 is set into a ring of sealant material 8 to help prevent air leaking through the holes 7. The sealant material 8 is applied deeply in order to make the seal more effective. In order to reduce the amount of air that will be lost if the wire is stripped from the holes 7, they are both long and narrow.

The pressure sensor 5 is a capacitor with two plates separated by a suitably elastic dielectric material. The capacitance of the pressure sensor changes with the pressure on capacitor because the plates are forced closer together or further apart. The pressure sensor 5 and the first coil 6 therefore form a resonant circuit with a fixed inductance but a variable capacitance. The resonant frequency of the circuit (ω) is related to the inductance (L) and the capacitance (C) by the formula:

$$\omega = (LC)^{-1/2}$$

Since the inductance of the coil is fixed, the capacitance of the pressure sensor 5 and hence the air pressure in the dust cap 1 can be calculated from the resonant frequency. The resonant frequency can be measured remotely using the remote sensing device 31 in FIG. 4 that incorporates a search coil 32 suitable for coupling with the first coil 6.

The dust cap 1 is made of a material with a high electromagnetic permeability such as steel or a nickel-iron alloy. Since the dust cap forms much of the core of the first coil 6, using a material with these characteristics increases the inductance of the coil. By increasing the inductance, the coupling between the first coil 6 and a sensing coil is increased, allowing the cap to be scanned from a greater distance. However in some embodiments, the cap is manufactured from materials with a lower permeability such as plastics, since this will not prevent the coil 6 from functioning as required and manufacturing a dust cap 1 from plastics is cheaper than using metals. In addition, a dust cap 1 manufactured to be identical to the old dust cap it replaces would be less likely to be stolen.

The dust cap 1 can be fitted to tyres that are already inflated, without needing to reduce the pressure in the tyres or remove the existing valve in the stem of the tyre. The dust cap 1 can also be moved between tyres easily.

Figure 2:
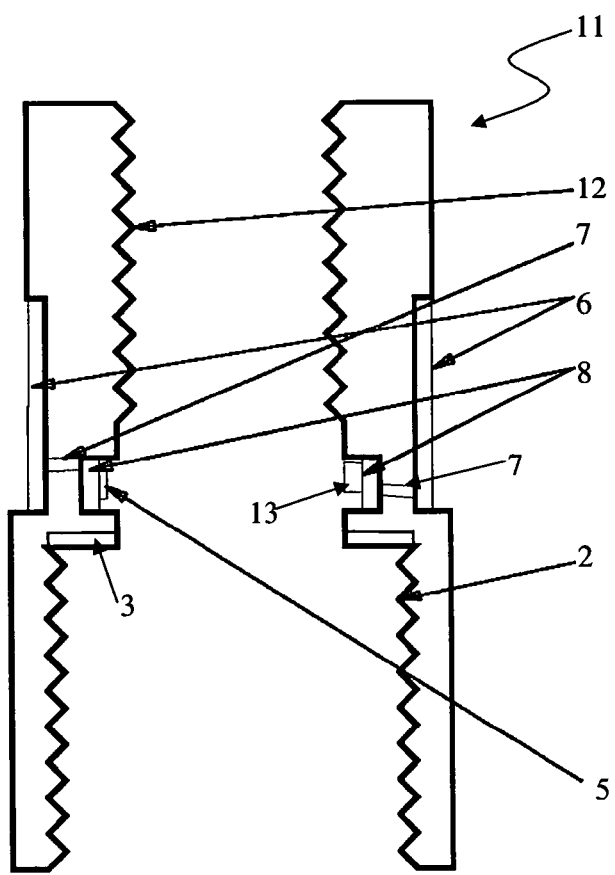
FIG. 2 is a diagram showing a cross section of a second embodiment of the invention in a valve stem extension.

FIG. 2 shows a second embodiment of the invention in a valve stem extension 11. This extension 11 includes a first thread 2 and a rubber seal 3 so that it can be screwed on to the dust cap thread of a stem and form an airtight seal. Typically the valve in a stem on the tyre of a heavy goods vehicle is screwed into place and can be removed. This ensures that the valve can be accessed for maintenance or easily replaced. To install the extension 11, the valve is first removed from the stem, and then screwed into the top of the extension 11 using a second thread 12. The extension 11 is then screwed onto the top of the stem, and a seal is formed that can be opened using the valve in the same manner as before the extension 11 was installed. Like the dust cap 1, the extension 11 can be retrofitted on an existing stem.

When the extension 11 is installed, a pressure sensor 5 and a temperature sensor 13 are exposed to the conditions inside the tyre. The pressure of air in a tyre varies with temperature, so it is useful to know the temperature of the air and so prevent misleading measurements. The pressure sensor 5 is again set in a bed of sealant 8 which prevents air from escaping down holes 7 provided for a connection to a first coil 6A on the outside of the extension 11. The temperature sensor 13 is attached in the same fashion to a second coil 6B, also on the outside of the extension 11. The capacitance of the temperature sensor 13 varies with temperature.

The extension 11 therefore provides two resonant circuits with two different resonant frequencies. The circuit that contains the pressure sensor 5 and the first coil 6A has a pressure sensitive resonant frequency $\omega_p$. The circuit that contains the temperature sensor 13 and the second coil 6B has a temperature sensitive frequency $\omega_t$. The characteristics of the components can be chosen so that $\omega_p$ is in a different range from $\omega_t$ for the pressures and temperatures that the extension 11 is expected to encounter. Separating the frequencies ensures that the measurements of the two circuits can be distinguished from one another. Therefore both the pressure and the temperature of the air in a tyre to which the extension 11 is attached can be measured by the remote sensing device 31 by determining the two resonant frequencies.

Other sensing devices can be attached and measured in the same way as the pressure sensor 5 and the temperature sensor 15. Multiple fixed resonant circuits that do not include sensors can also be included, so that the extension 11 provides a unique ID number when interrogated by the remote sensing device 31.

The extension 11 can be fitted to tyres that were not designed to incorporate a pressure sensing device originally. In the event of a malfunction, the extension 11 can be quickly and simply accessed for repairs or replaced if necessary.

Figure 3:
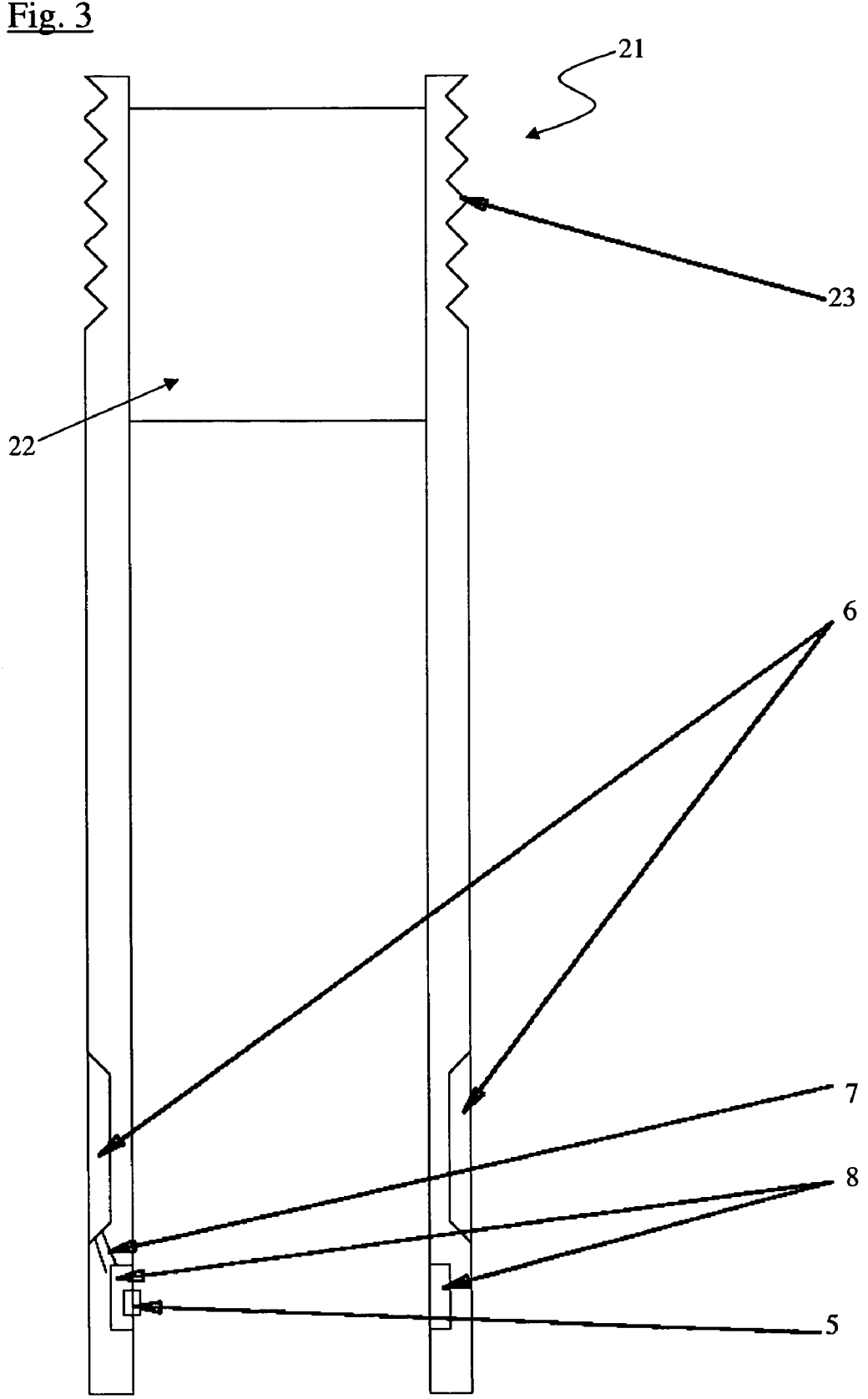
FIG. 3 is a diagram showing a cross section of a third embodiment of the invention in a valve stem.

FIG. 3 shows a third embodiment of the invention in an adapted stem 21. Like a standard stem, the adapted stem 21 has a valve 22 and an external thread 23 for attaching a standard dust cap. However, the adapted stem 21 includes a pressure sensor 5 connected to a coil 6 through holes 7, so that the pressure of the gas in the tyre can be measured.

Figure 4:
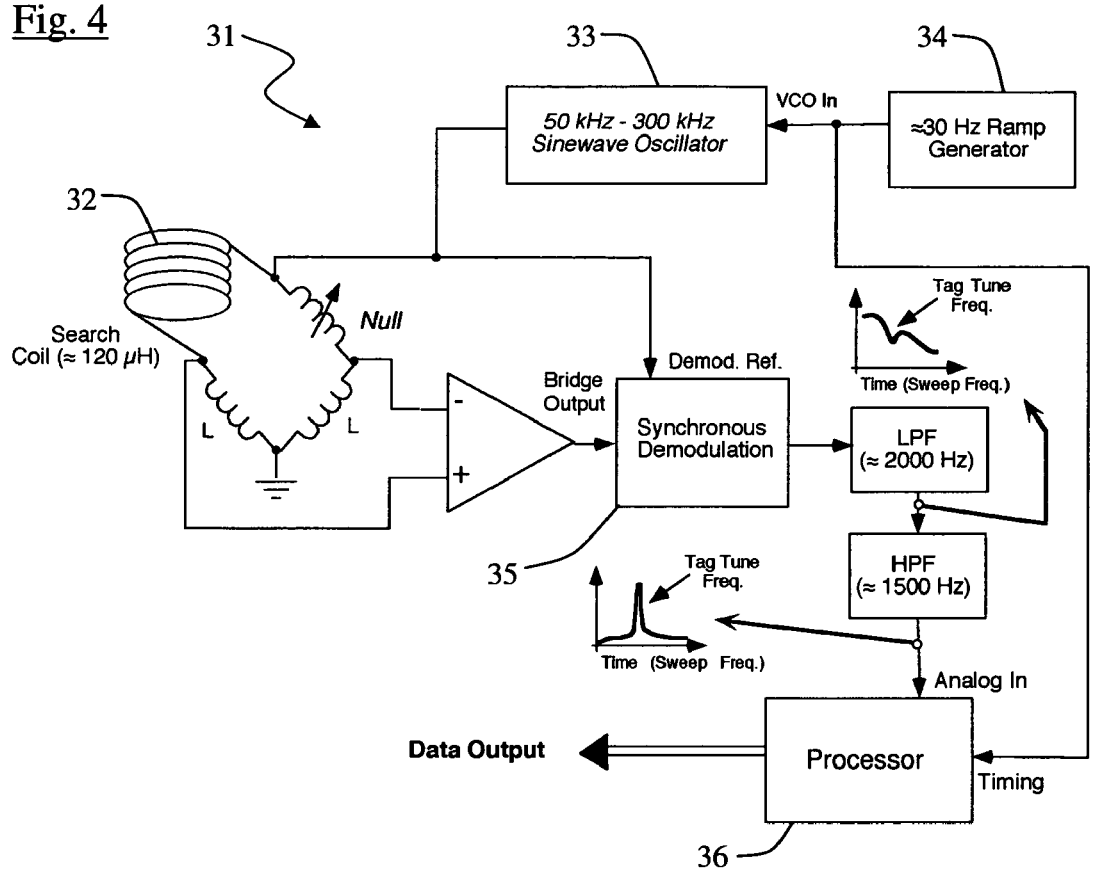
FIG. 4 is a circuit diagram of a remote sensing device suitable for use with the embodiments of the invention shown in FIGS. 1, 2 and 3.

FIG. 4 shows a remote sensing device 31 suitable for use with the embodiments of the invention shown in FIGS. 1, 2 and 3. A search coil 32 is provided with an oscillating input current by a variable oscillator 33 driven by a ramp generator 34. When the search coil 32 is loosely coupled to a first coil 6 of the circuit to be scanned its output will show a variation at the resonant frequency of the scanned circuit. A synchronous demodulator 35 removes the original signal from the output of the search coil so that the variation due to resonance can be distinguished. Finally, a processor 36 compares the variation in output from the search coil 32 to the variation in the frequency of the input due to the ramp generator 34 in order to determine the resonant frequency.

This invention provides a valve stem 21 for a tyre. The valve stem 21 comprises at least one electrical circuit for measuring pressure within the tyre. The circuit comprises a capacitive pressure sensor 5 and an inductive coil 6. The inductive coil 6 is coiled around the valve stem 21.

The invention claimed is:

1. A device for determining the air pressure within a tyre comprising at least one electrical circuit for measuring the pressure, the circuit comprising:
   a capacitive pressure sensor; and
   an inductive coil,
   wherein the inductive coil which is coiled around the valve stem, characterised in that the capacitive pressure sensor and the coil form a resonant circuit with a fixed inductance but a variable capacitance.

2. A device as recited in claim 1, wherein the device is adapted to be removably connected to the valve stem of the tyre.

3. A device as recited in claim 2, wherein the device is provided with a prong adapted to open the tyre valve and thereby release air from the tyre into the device.

4. A device as recited in claim 3, wherein the first portion is a dust cap.

5. A device as recited in claim 3, wherein the first portion is a valve extension.

6. A device as recited in claim 1, wherein the inductive coil is located on the outer surface of the valve stem and the pressure sensor is in fluid communication with the air passageway of the valve stem.

7. A device as recited in claim 1, further comprising at least one electrical circuit for measuring temperature.

* * * * *